(12) United States Patent
Schwarz et al.

(10) Patent No.: US 9,340,121 B2
(45) Date of Patent: May 17, 2016

(54) METHOD AND SYSTEM FOR HEATING A VEHICLE BATTERY

(75) Inventors: Jonathan R. Schwarz, Clawson, MI (US); Gregory E. Smith, Toledo, OH (US); Damon R. Frisch, Troy, MI (US); Ian L. Hanna, Clarkston, MI (US); Brian J. Koch, Berkley, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1129 days.

(21) Appl. No.: 13/086,831

(22) Filed: Apr. 14, 2011

(65) Prior Publication Data

US 2012/0261397 A1 Oct. 18, 2012

(51) Int. Cl.
| | | |
|---|---|---|
| *B60L 1/02* | (2006.01) | |
| *H02J 7/00* | (2006.01) | |
| *H02J 7/04* | (2006.01) | |
| *H02J 7/16* | (2006.01) | |

(Continued)

(52) U.S. Cl.
CPC ........... *B60L 11/1862* (2013.01); *B60L 11/123* (2013.01); *B60L 11/14* (2013.01); *B60L 11/1875* (2013.01); *H01M 10/615* (2015.04); *H01M 10/625* (2015.04); *H01M 10/633* (2015.04); *H01M 10/637* (2015.04); *B60L 2210/40* (2013.01); *B60L 2240/423* (2013.01); *B60L 2240/545* (2013.01); *H01M 10/052* (2013.01); *H01M 2220/20* (2013.01); *Y02T 10/6217* (2013.01); *Y02T 10/642* (2013.01); *Y02T 10/7005* (2013.01); *Y02T 10/705* (2013.01); *Y02T 10/7011* (2013.01); *Y02T 10/7016* (2013.01); *Y02T 10/7044* (2013.01); *Y02T 10/7077* (2013.01); *Y02T 10/7241* (2013.01)

(58) Field of Classification Search
CPC ..................... H01M 10/5006; H01M 10/5016; H01M 10/5022; H01M 10/5026; B60L 11/14; B60L 11/123; B60L 11/1862; B60L 11/1875
USPC .......... 219/200, 201, 202, 205; 320/132, 150; 123/179.4; 701/113; 180/65.29, 65.31
See application file for complete search history.

(56) References Cited

U.S. PATENT DOCUMENTS

| | | | |
|---|---|---|---|
| 6,163,135 A | 12/2000 | Nakayama et al. | |
| 6,271,648 B1 * | 8/2001 | Miller | ........................... 320/150 |

(Continued)

FOREIGN PATENT DOCUMENTS

CN 102005624 A 4/2011

OTHER PUBLICATIONS

Chinese Office Action dated Feb. 25, 2014, 9 pages.

*Primary Examiner* — Dana Ross
*Assistant Examiner* — Lindsey C Teaters
(74) *Attorney, Agent, or Firm* — Reising Ethington, P.C.; Lionel D. Anderson

(57) ABSTRACT

A method and system for heating a vehicle battery, such as the type used for vehicle propulsion in a hybrid electric vehicle (HEV). Depending on the battery chemistry involved, such batteries may not perform well in extremely cold environments. For instance, a lithium-ion battery can exhibit a high internal resistance when the battery is extremely cold, which in turn can negatively affect the available power or other capabilities of the battery. According to an exemplary embodiment, the method and system take advantage of the high internal resistance in a cold vehicle battery by purposely cycling electrical current in and/or out of the battery so that heat is created. This heat warms up the vehicle battery and thereby improves its overall performance and capabilities.

14 Claims, 2 Drawing Sheets

Figure 1:
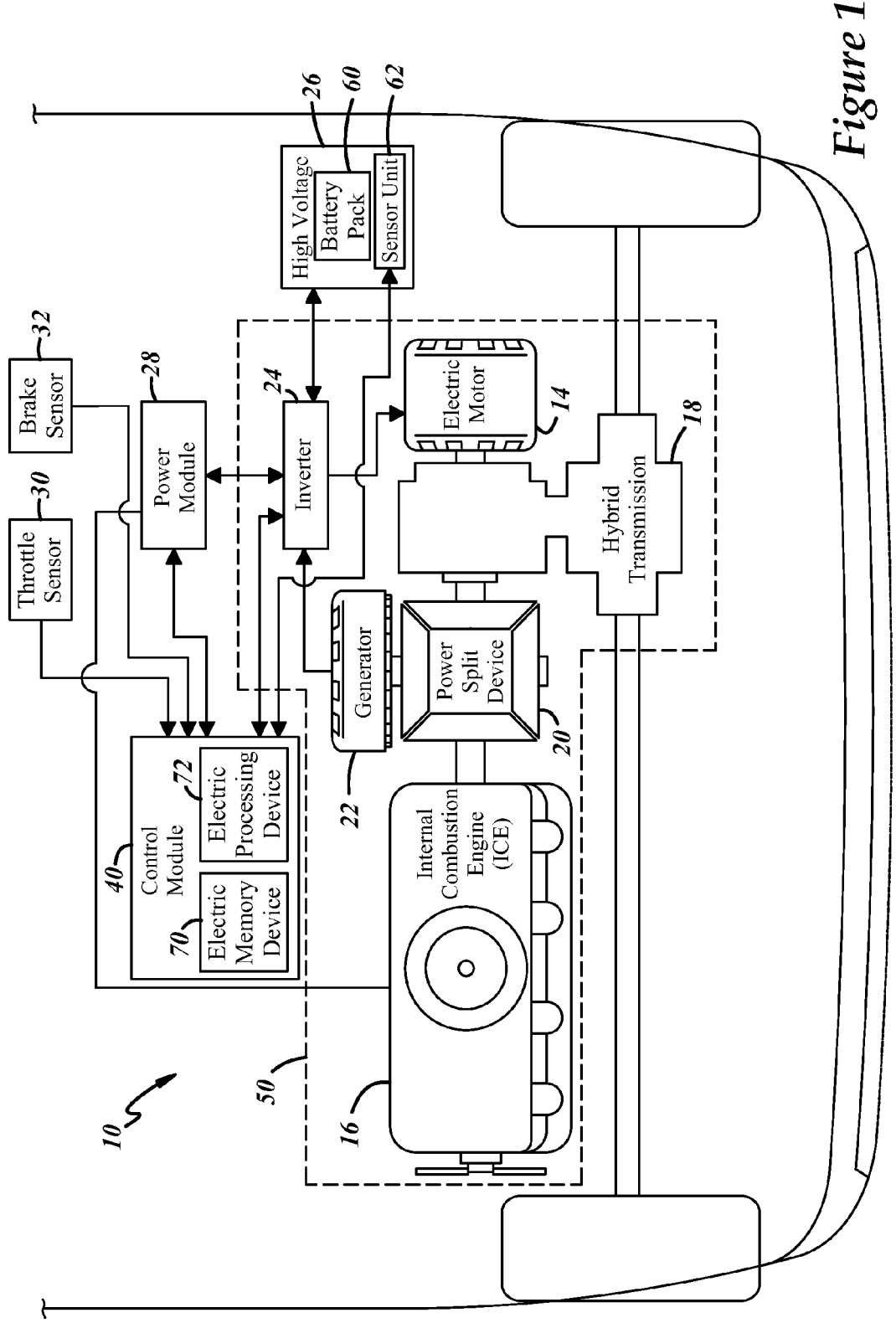

(51) Int. Cl.
  *B60W 10/24* (2006.01)
  *B60W 20/00* (2006.01)
  *B60L 11/18* (2006.01)
  *B60L 11/12* (2006.01)
  *B60L 11/14* (2006.01)
  *H01M 10/625* (2014.01)
  *H01M 10/615* (2014.01)
  *H01M 10/637* (2014.01)
  *H01M 10/633* (2014.01)
  *H01M 10/052* (2010.01)

(56) References Cited

U.S. PATENT DOCUMENTS

| | | | |
|---|---|---|---|
| 6,424,053 B1 * | 7/2002 | Wakashiro | B60K 6/485 180/65.26 |
| 7,647,920 B2 * | 1/2010 | Amano | B60K 6/48 123/519 |
| 7,665,559 B2 * | 2/2010 | De La Torre-Bueno | B60K 6/46 180/65.285 |
| 7,783,396 B2 * | 8/2010 | Arita | B60W 10/06 180/65.28 |
| 8,151,753 B2 * | 4/2012 | Kamiyama | B60H 1/00314 123/142.5 E |
| 2003/0231005 A1 | 12/2003 | Kohama et al. | |
| 2007/0024244 A1 * | 2/2007 | Zhu et al. | 320/150 |
| 2009/0017986 A1 * | 1/2009 | Oakes | G06Q 40/00 477/98 |
| 2010/0270976 A1 * | 10/2010 | Tamura | 320/136 |
| 2011/0052944 A1 | 3/2011 | Matthias et al. | |
| 2011/0232597 A1 * | 9/2011 | Benchetrite et al. | 123/179.4 |
| 2012/0158228 A1 * | 6/2012 | Biondo et al. | 701/22 |

* cited by examiner

METHOD AND SYSTEM FOR HEATING A VEHICLE BATTERY

TECHNICAL FIELD

The present invention generally relates to vehicle batteries and, more particularly, to vehicle batteries used in vehicle propulsion.

BACKGROUND

In hybrid electric vehicles (HEVs), extended-range electric vehicles (EREVs), battery electric vehicles (BEVs) and other types of vehicles that use high voltage batteries for purposes of vehicle propulsion, the state or condition of the battery can be important to the performance of the vehicle. There are a number of different battery conditions that can impact battery performance, including battery temperature. For instance, certain battery types—like those based on lithium-ion chemistries—may be negatively affected by extremely cold temperatures, as such temperatures can increase the internal resistance within the battery. If the battery temperature is cold enough, these types of batteries may not be able to sufficiently accept or provide electrical power, which in turn can affect their performance.

SUMMARY

According to one aspect, there is provided a method of heating a vehicle battery used for vehicle propulsion. The method may comprise the steps of: (a) sensing one or more battery conditions with battery sensors, the battery conditions include a battery temperature; (b) comparing the battery temperature to a temperature threshold; and (c) when the battery temperature is less than the temperature threshold, using at least one of a charging operation or a discharging operation to raise the battery temperature.

According to another aspect, there is provided a method of heating a vehicle battery used for vehicle propulsion. The method may comprise the steps of: (a) sensing one or more battery conditions with battery sensors, the battery conditions include a battery temperature; (b) comparing the battery temperature to a temperature threshold; and (c) when the battery temperature is less than the temperature threshold, cycling electrical current into and out of the vehicle battery such that the internal resistance of the vehicle battery causes the electrical current to raise the battery temperature.

According to another aspect, there is provided a system for heating a vehicle battery. The system may comprise a vehicle battery, a generator electrically coupled to the vehicle battery, a motor electrically coupled to the vehicle battery, and a control module electronically coupled to the vehicle battery. If a battery temperature is less than a temperature threshold, then the control module causes at least one of the generator or the motor to exchange electrical current with the vehicle battery so that the electrical current and an internal resistance in the vehicle battery raise the battery temperature.

DRAWINGS

Figure 2:
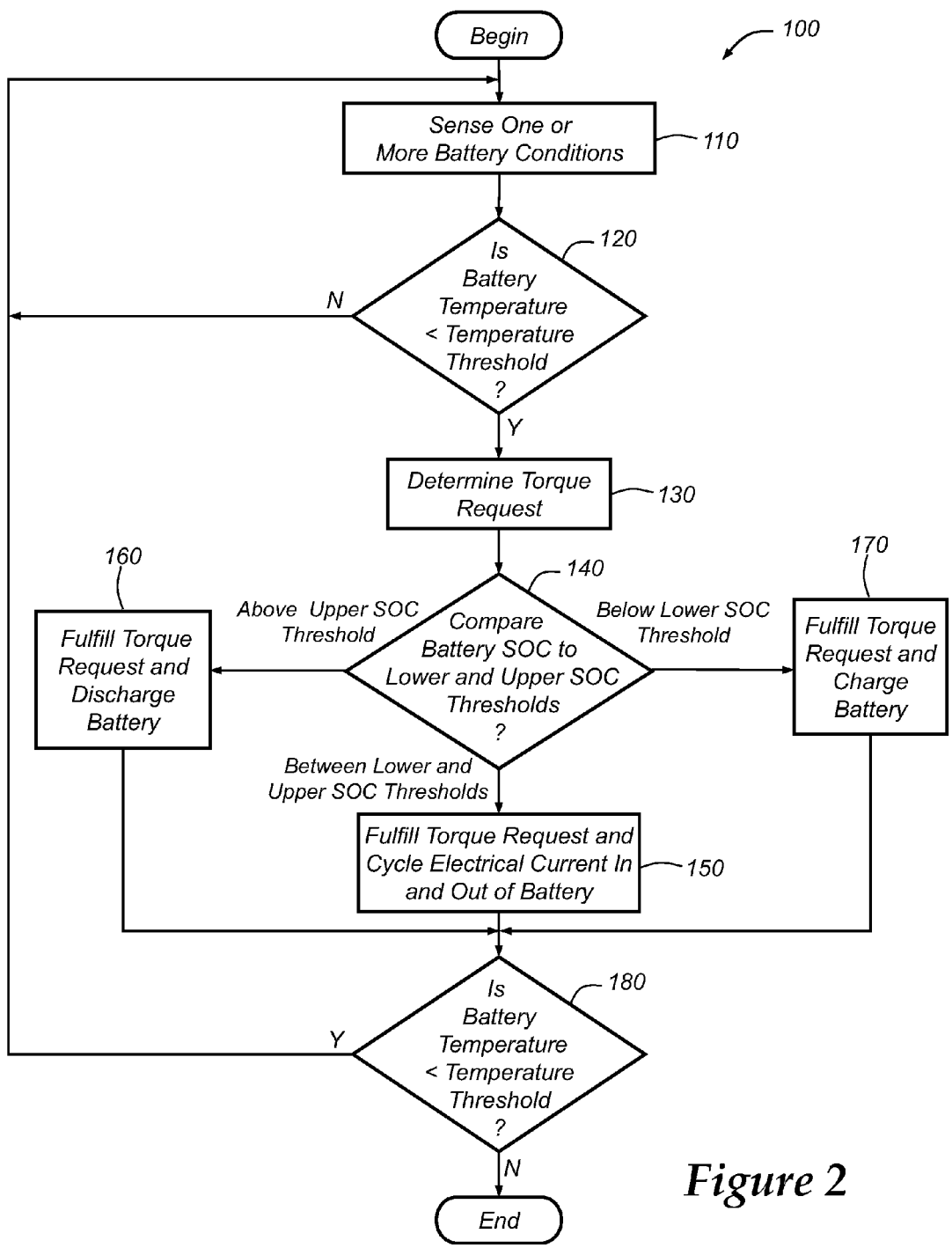

Preferred exemplary embodiments will hereinafter be described in conjunction with the appended drawings, wherein like designations denote like elements, and wherein:

FIG. 1 is a block diagram depicting at least part of an exemplary hybrid electric vehicle (HEV); and FIG. 2 is a flowchart illustrating an exemplary method for heating a vehicle battery that may be used with the exemplary HEV shown in FIG. 1.

DETAILED DESCRIPTION

The method described herein may be used to heat a vehicle battery, such as the type used for vehicle propulsion in a hybrid electric vehicle (HEV). Depending on the battery chemistry involved, such batteries may not perform well in extremely cold environments. For instance, a lithium-ion battery can exhibit a high internal resistance when the battery is extremely cold, which in turn can negatively affect the available power or other capabilities of the battery. Diminished battery power may affect electric mode propulsion, impede regenerative braking, or negatively impact the fuel economy of the vehicle, to cite several possibilities. Moreover, these types of batteries oftentimes provide power not just for propulsion, but also for operating transmission components like clutches and gears during shifting and other quick transient events. If the available battery power is diminished significantly, then the drivability of the vehicle can also be negatively impacted. According to an exemplary embodiment, the present method takes advantage of the high internal resistance in a cold vehicle battery by purposely cycling electrical current in and/or out of the battery so that heat is created. This heat warms up the vehicle battery and thereby improves its overall performance and capabilities.

It should be appreciated that while the embodiment described below is provided in the context of an exemplary hybrid electric vehicle (HEV), the present method may be used with any type of vehicle that utilizes a battery for purposes of vehicle propulsion and is not limited to any particular type. For example, the present method may be used with plug-in hybrid electric vehicles (PHEVs), extended-range electric vehicles (EREVs), serial hybrids, parallel hybrids, mixed hybrids, strong hybrids, two-mode hybrids, purely electric battery electric vehicles (BEVs), and/or any vehicle having a battery used for vehicle propulsion, to cite a few possibilities.

With reference to FIG. 1, there is shown an exemplary hybrid system 10 for use in a hybrid electric vehicle (HEV). According to this exemplary embodiment, system 10 includes one or more electric motors 14, an internal combustion engine 16, a hybrid transmission 18, a power split device 20, a generator 22, an inverter 24, a high voltage vehicle battery 26, a power module 28, a throttle sensor 30, a brake sensor 32, and a hybrid control module 40. Skilled artisans will appreciate that exemplary system 10 may include more, less or a different combination of components, devices and/or modules than those schematically shown here, and that the present system and method is not limited to this particular embodiment. One or more of the components, devices and/or modules shown in FIG. 1 may be integrated or otherwise combined with other parts of the hybrid electric vehicle, as the block diagram in that figure is only meant to generally and schematically illustrate one potential hybrid system arrangement.

Generally speaking, hybrid system 10 uses electric motor 14 and/or engine 16 to drive the wheels and hence propel the vehicle via an exemplary hybrid drivetrain 50. The hybrid drivetrain 50 shown here generally includes one or more electric motor(s) 14, engine 16, hybrid transmission 18, power split device 20, generator 22 and inverter 24. Because each of these components is generally known and understood in the art, a brief explanation of the exemplary hybrid drivetrain components has been provided in lieu of a detailed recitation of their structure and functionality.

Electric motor 14 may propel the hybrid electric vehicle using electric power stored in high voltage vehicle battery 26, and may include any type of suitable electric motor known in the art. While FIG. 1 schematically depicts electric motor 14 as a discrete device, other embodiments including those that incorporate or otherwise combine the electric motor with the hybrid transmission, generator, etc. may also be used. Engine 16 may propel the hybrid electric vehicle using conventionally combustion techniques, and may include any suitable type of engine known in the art. Some examples of suitable engines include gasoline, diesel, ethanol and flex-fuel engines, as well as variants of the internal combustion engine such as the rotary engine. Hybrid transmission 18 and power split device 20 help transfer mechanical output from electric motor 14 and/or engine 16 to the vehicle wheels, as well as from the vehicle wheels to generator 22. For example, power split device 20 can selectively direct power from engine 16 to hybrid transmission 18 during vehicle propulsion, and can direct power from the vehicle wheels to generator 22 during regenerative braking. Generator 22 uses mechanical motion provided by power split device 20 to generate electrical power for charging high voltage vehicle battery 26, for operating electrical accessories within the vehicle, etc. Any number of suitable generators known in the art may be used. Inverter 24 converts energy in one form to another form and transmits the converted energy to a destination such as high voltage vehicle battery 26 or electric motor 14 (e.g., AC power from the generator may be converted into DC power for the high voltage vehicle battery). Again, the preceding description of exemplary hybrid drivetrain 50 is only intended to illustrate one potential hybrid arrangement and to do so in a general way. Any number of other hybrid arrangements, including those that significantly differ from the one shown in FIG. 1, may be used instead.

High voltage vehicle battery 26 stores electrical energy that may be used to propel the vehicle via electric motor 14, and may be of any suitable battery type known in the art. For instance, examples of suitable battery types include all types of lithium-ion (e.g., lithium iron phosphate, lithium nickel manganese cobalt, lithium iron sulfide and lithium polymer, etc.), lead-acid, advanced lead-acid, nickel metal hydride (NiMH), nickel cadmium (NiCd), zinc bromide, sodium nickel chloride (NaNiCl), zinc air, vanadium redox, and others. According to an exemplary embodiment, high voltage vehicle battery 26 includes a lithium-ion battery pack 60 having a number of individual battery cells and a sensor unit 62. The battery pack 60 may provide approximately 40-600 V, depending on its particular design and application. For example, a heavy vehicle like a truck that uses a two-mode hybrid system may require a high voltage battery pack capable of providing about 500 V, where a lighter vehicle may only need about 200 V. In another embodiment, the hybrid system 10 may be a belt-alternator-starter (BAS) type system and thus only require a battery pack that provides about 40-110 V. In any case, battery pack 60 may be designed to withstand repeated charge and discharge cycles and can receive electrical energy from generator 22 through inverter 24. The battery pack 60 may provide electrical energy to electric motor 14 through inverter 24 or it may provide energy to the motor directly, for example.

Sensor unit 62 may sense, monitor, evaluate, control, manage, etc. certain charging and/or discharging functions related to battery pack 60. In one exemplary embodiment, sensor unit 62 is a battery pack control module (BPCM) that is integrated within vehicle battery 26 and includes one or more battery sensor(s) coupled to battery pack 60, as well as processing and memory resources. The battery sensors may include temperature, state-of-charge (SOC), voltage and/or current sensors, as well as any other suitable battery sensor, and provide readings that can be processed by the sensor unit itself and/or forwarded on to other devices, components, modules, etc. For example, various battery conditions can be gathered, processed and saved by sensor unit 62 and then transmitted to control module 40 in the form of some type of signal. Although battery pack 60 and sensor unit 62 are schematically shown here as being integrated into a single component, it should be appreciated that other embodiments can involve mounting the sensor unit external to the battery pack and connecting the battery pack-mounted sensors to the sensor unit via some type of communication medium, for example.

Power module 28 couples high and low voltage systems of the vehicle together, and may perform a number of different functions in that capacity. In an exemplary embodiment, power module 28 is an accessory power module (APM) that is electrically coupled to both high and low voltage buses in the vehicle so that electrical energy can be exchanged therebetween. Power module 28 may include any combination of processing and memory resources, as well as transformers and/or other electrical components used for transmitting or exchanging electrical energy between different components, devices, modules, etc. of hybrid system 10. Some examples of possible power module functions include stepping down DC power from inverter 24 and using it to charge a low voltage battery unit, and stepping down DC power from high voltage vehicle battery 26 and using it to charge the low voltage battery unit. In some embodiments, power module 28 can be thought of as a replacement for a traditional vehicle alternator except that it can provide energy to a low voltage battery unit even when the vehicle engine is off. It is possible for power module 28 to be combined or otherwise integrated with inverter 24, for example.

Throttle sensor 30 provides a torque request signal that is generally representative of the position, movement, exerted force, and/or state of the accelerator pedal. Thus, the torque request signal is generally representative of the acceleration or torque being requested by the driver. Skilled artisans will appreciate that a number of different types of throttle sensors could be used; these include non-contact-type sensors (e.g., optical sensors, electro-magnetic sensors, etc.), contact-type sensors (e.g., potentiometers, contact switches, etc.), as well as those that measure the force that the drive exerts against the accelerator pedal, to name a few. In an exemplary embodiment, throttle sensor 30 includes a non-contact-type sensor with a Hall-Effect element that is operably coupled to the accelerator pedal so that it can determine the current position, rotational velocity and/or state of the accelerator pedal. In a drive-by-wire application, throttle sensor 30 may be integrated with an accelerator pedal simulator or emulator that conveys the expected mechanical feel of the accelerator pedal to the driver, as well as provides a torque request signal. It is not necessary for the torque request signal to come from a throttle sensor coupled to an actual accelerator pedal; in some instances, an electronic module such as one that accommodates a cruise control could provide a torque request signal.

Brake sensor 32 provides a brake signal that is generally representative of the position, movement, exerted force, and/or state of the brake pedal. Thus, the brake signal is generally representative of the braking intent of the driver. Any number of different types of brake sensors may be used; these include non-contact-type sensors (e.g., optical sensors, electro-magnetic sensors, etc.), contact-type sensors (e.g., potentiometers, contact switches, etc.), as well as those that measure the force that the driver exerts against the brake pedal, to name a few. In a brake-by-wire application, brake sensor 32 may be integrated with a brake pedal simulator or emulator that conveys the expected mechanical feel of the brake pedal to the driver, as well as provides a brake signal.

Hybrid control module 40 gathers information from all around hybrid system 10 and may execute one or more electronic instructions in order to control certain aspects of the hybrid system's operation. The control module 40 can be electronically coupled to vehicle battery 26 for receiving one or more battery sensor signals, to power module 28 for receiving a power module signal, to throttle and brake sensors 30, 32 for receiving torque request and brake request signals, respectively, and/or to other devices in hybrid system 10. Control module 40 may receive readings, data, information, signals, etc., and/or it may send commands, instructions, signals, etc. Of course, control module 40 may be coupled to and/or receive information from other components, devices, modules, etc., and control module 40 may be integrated or otherwise combined with other parts of the hybrid electric vehicle. In one example, the control module includes a hybrid control processor (HCP) and is coupled to an engine control module (not shown).

Control module 40 may include any variety of electronic processing devices, memory devices, input/output (I/O) devices, and/or other known components, and may perform various control and/or communication related functions. In an exemplary embodiment, control module 40 includes an electronic memory device 70 that stores various sensor readings (e.g., battery temperature, SOC, voltage, current sensor readings), look up tables or other data structures, algorithms, etc. Memory device 70 may also store pertinent characteristics and background information pertaining to battery state-of-charge (SOC) limits, battery voltage limits, battery current limits, battery temperature limits, temperature profiles, etc. In the exemplary embodiment shown in FIG. 1, control module 40 also includes an electronic processing device 72 (e.g., a microprocessor, a microcontroller, an application specific integrated circuit (ASIC), etc.) that executes instructions for software, firmware, programs, algorithms, scripts, etc. that are stored in memory device 70 and may govern the processes and methods described herein. Control module 40 may be electronically connected to other vehicle devices and modules via a suitable vehicle communications connection and can interact with them when required. These are, of course, only some of the possible arrangements, functions and capabilities of control module 40, as other embodiments could also be used.

Depending on the particular embodiment, control module 40 may be a stand-alone vehicle electronic module (e.g., a hybrid control module (HCM), a vehicle control integrated module (VCIM), a traction power inverter module (TPIM), a battery power inverter module (BPIM), part of an instrument cluster itself, an engine control module (ECM), etc.), it may incorporated or included within another vehicle electronic module (e.g., a power train control module or a hybrid control module), or it may be part of a larger network or system (e.g., a battery management system (BMS), a vehicle energy management system, a hybrid control system, etc.), to name a few possibilities. Control module 40 may also be part of or interact with a system that determines a desired hybrid operating mode (e.g., accelerating, braking, idling, stopping, etc.) and may implement electrical power management actions accordingly.

As explained above, the exemplary hybrid system 10 shown in FIG. 1 is only a general and schematic illustration of one potential hybrid system. The method described herein may be used with any number of vehicle systems and is not limited to the specific one shown here.

Turning now to FIG. 2, there is shown an exemplary embodiment of a method 100 for heating a vehicle battery, such as high voltage vehicle battery 26. In this particular embodiment, method 100 takes advantage of the high internal resistance of vehicle battery 26 when it is cold by purposely cycling electrical current in and out of the battery so that heat is created. This heat warms up vehicle battery 26, thereby improving its performance. Cycling electrical current in and out of vehicle battery 26 may result in some energy losses, but with some battery types (e.g., those based on lithium-ion chemistries) such energy losses are more than offset by the accelerated heating of the battery which results in better battery performance overall. Moreover, using method 100 to heat vehicle battery 26 may minimize the need for additional battery heating elements which can add cost and weight to the vehicle. That is not to say, however, that method 100 could not be used with battery heating elements, as that is a possibility as well.

Beginning with step 110, the method senses one or more battery conditions such as battery temperature, battery state-of-charge (SOC), battery voltage, battery current, etc. Step 110 may sense, gather or otherwise determine battery conditions for individual cells within battery pack 60, for a collection or block of cells within the battery pack, for the entire battery pack, or according to some other method known in the art. Step 110 may determine battery conditions based on extremities (e.g., use the coldest or warmest cell in the battery pack for temperature, use the lowest or highest SOC cell for charge, etc.), it may determine battery conditions based on averages (e.g., use the average cell temperature or cell SOC over a number of cells), or it may determine battery conditions based on some other suitable method. According to an exemplary embodiment, battery sensors 62 monitor battery pack 60, determine battery temperature and battery SOC, and provide battery temperature and battery SOC signals to control module 40; these signals may be combined and provided together or they may be provided separately. This is, of course, only one possibility, as other battery conditions may be gathered and/or provided according to other techniques. Step 110 may employ any suitable technique or method for sensing, measuring, estimating, evaluating or otherwise determining battery conditions; this includes both directly and indirectly determining battery conditions. Skilled artisans will recognize that some battery conditions can be also obtained via lookup tables, calculations, empirical tables, etc.

Next, step 120 compares the battery temperature to a temperature threshold to see if the battery temperature is below a certain limit. As mentioned above, extremely cold temperatures can negatively impact the performance of vehicle battery 26, particularly if it is a lithium-ion battery or some other type of battery where the internal resistance of the battery has a strong inverse relationship to temperature. Vehicle battery 26 usually includes a number of cells connected in series; thus, the increased internal resistance in each cell causes a decrease in amperage in each cell and can have a compounded effect. Step 120 may use one of a number of different techniques to compare the battery temperature to a temperature threshold. In an exemplary embodiment, control module 40 compares the coldest cell temperature or an average cell temperature from battery sensors 62 with the temperature threshold (e.g., a threshold of −20° C.). Other comparison techniques may be employed. The temperature threshold may be a static threshold (e.g., one determined at vehicle design and based on battery size, battery chemistry, vehicle needs, etc.) or it may be a dynamic threshold (e.g., one that varies over time as the battery ages and experiences performance degradation). In the case of a dynamic threshold, the temperature threshold may need to increase over time so that the heating steps of the method are performed at somewhat higher temperatures. In another embodiment, the temperature threshold is static and thus stays the same; however, the charging and discharging steps of the method are performed for longer periods of time in order to address the battery degradation. Other thresholds may be used instead. If the battery temperature is below the temperature threshold then method 100 proceeds to step 130; otherwise, the battery is already warm enough and the method simply loops back to step 110 for continued monitoring.

It is also possible for the method to check the battery temperature to make sure it is within certain prescribed limits. These limits may be used in conjunction with the temperature threshold, or they may constitute a separate and independent check that ensures that the battery temperature is within some overall acceptable temperature range. If the battery temperature is outside of these limits, a variety of remedial actions known in the art may be taken.

Step 130 determines a torque request, which is generally representative of the acceleration or torque being requested of the vehicle. Knowing the requested torque may provide the method with an insight as to how much electrical power is needed to fulfill the propulsion needs of the vehicle and, thus, how much electrical energy will be available for heating the battery. According to an exemplary embodiment, control module 40 receives and evaluates a torque request from throttle sensor 30 in order to determine how much torque or acceleration the driver is requesting via the acceleration pedal. It is not necessary, however, for the torque request to come from throttle sensor 30, as it could come from one or more electronic modules in the vehicle, such as the module that manages the cruise control features of the vehicle. In step 130, it is also possible for control module 40 to receive additional signals, such as a brake request signal from brake sensor 32 or a transmission status signal that indicates if the vehicle is in park, reverse, neutral, drive, etc.; these signals may be combined and provided together or they may be provided separately. Such signals may be used in subsequent steps of the method, as will be explained.

Step 140 evaluates one or more battery conditions and, based at least partially on these evaluations, selects the most suitable method for heating the vehicle battery. In an exemplary embodiment, step 140 compares the battery state-of-charge (SOC) to one or more SOC thresholds in order to evaluate the current state of vehicle battery 26. To illustrate this point, consider the example where a lower SOC threshold is set to 40%, an upper SOC threshold is set to 50%, and the current battery SOC is 43%; the lower and upper SOC thresholds generally represent the boundaries of a desired SOC range. In this example where the current SOC is in between the lower and upper SOC thresholds, step 140 directs the method to step 150 which both addresses the torque request from the driver and cycles electrical current in and out of vehicle battery 26 in order to heat it up. The 43% SOC example represents a situation where the battery SOC is within a desired range, thereby allowing the method to cycle electrical current (i.e., to both charge and discharge the vehicle battery). Cycling electrical current is generally the fastest way among steps 150-170 to heat vehicle battery 26, but it is not always a viable option. For instance, if the battery SOC is 53%, then step 140 may determine that because this is above the upper SOC threshold the method should be directed to step 160, which both addresses the present torque request and discharges vehicle battery 26 so that the SOC is brought back within the desired range. Instead of cycling electrical current in and out of vehicle battery 26, step 160 heats the battery by discharging or drawing current out of the battery. Conversely, if the battery SOC is below the lower SOC threshold at a value of 37%, for example, then the method may be directed to step 170. This step both addresses the present torque request and heats vehicle battery 26 by charging it. In each of the previous examples, step 140 evaluates the capabilities or condition of the vehicle battery and, based at least partially on that evaluation, selects the best technique for heating the battery while maintaining it in a desired state-of-charge (SOC).

Of course, step 140 may utilize other factors (e.g., battery temperature, requested torque, transmission state (e.g., park, reverse, neutral, drive), vehicle mode selection (e.g., sport mode, economy mode), etc.) in lieu of or in addition to SOC in the course of its evaluation. For example, if the vehicle is in park, then the present torque request would be zero because the vehicle is stationary. This may enable the method to more aggressively cycle electrical current in and out of vehicle battery 26, and hence heat the battery up more quickly, because the method does not have to simultaneously fulfill or satisfy a torque request from the driver. As with the temperature threshold described above, the lower and upper SOC thresholds used by step 140 may be static thresholds, dynamic thresholds, multi-factor thresholds (e.g., ones that consider both SOC and requested torque), etc. Other techniques and methods may be used by step 140, as that step is not limited to the exemplary embodiments described here.

Step 150 fulfills the present torque request and cycles electrical current into and out of the vehicle battery by quickly charging and discharging the battery. This rapid oscillation between charging and discharging operations creates heat in the vehicle battery according to the relationship $I^2R$, wherein (I) generally represents battery current and (R) generally represents internal resistance of the battery. Those skilled in the art will appreciate that as the battery temperature rises the internal resistance (R) decreases, and as the internal resistance (R) decreases the current flow (I) increases, which in turn generates more heat according to an exponential factor. Hence, the vehicle battery can heat up quite quickly during this step; some suggestions are that it can heat up by as much as 1° C./minute.

In an exemplary embodiment where the current battery SOC is in between lower and upper SOC thresholds (say, the 43% example above) and the vehicle is in park, control module 40 instructs system 10 to rapidly charge and discharge vehicle battery 26 so that the current flow in and out of the battery creates heat; this may be done without regard to requested torque because the vehicle is stationary. One way to do this, for example, is for an engine to drive a generator so that it charges the vehicle battery and then for the battery to discharge, thus causing the SOC to oscillate but stay within the desired SOC range. Now consider the same example, only the vehicle is in drive. A control module may satisfy the requested torque at the vehicle wheels using any suitable technique known in the art and also modulates the charging and discharging operations. One way to modulate charging and discharging is to alter the output of the engine (e.g., by changing the engine torque, RPMs, etc.) so that it purposely creates more or less electrical power than is needed to satisfy the torque request. During the charging portion of this cycle, the generator provides electrical power to the motor so that it satisfies the torque request and it provides additional electrical power to the battery so that it is charged; that is, the generator purposely creates more electrical power than is needed by the motor to fulfill the torque request. During the discharging portion of this cycle, the generator provides some electrical power to the motor, but purposely provides less than is needed for the torque request. This causes the motor to draw electrical power from the battery in order to make up for the deficiency so that the battery is discharged. By controlling both the charging and discharging operations, step 150 may be able to both heat the vehicle battery through current flow and maintain its SOC within the desired window.

Step 150 may use a number of different techniques for controlling or overseeing the charging and discharging operations. For instance, control module 40 may use the SOC of vehicle battery 26 as the main factor for deciding when to initiate the charging and discharging cycles within step 150. Other techniques that may be used in addition to or in lieu of SOC include time of charge or discharge (e.g., the battery is charged for 10 seconds, then discharged for 10 seconds, then charged for 10 seconds, and so on) and driver demands (e.g., the battery is charged when braking, discharged when accelerating). Skilled artisans will appreciate that some modifications may need to be made to the exemplary charging and discharging operations discussed above when the method is used in other types of vehicles or other types of vehicle architectures.

Step 160 fulfills the torque request and discharges the battery. As explained above, step 160 may be used when the current SOC of the battery is greater than the upper SOC threshold; thus, the need to discharge the battery. In one embodiment, control module 40 receives a torque request from throttle sensor 30 and fulfills the torque request according to any suitable means known in the art. At the same time, control module 40 may reduce the battery SOC by discharging vehicle battery 26 according to one or more of the discharging techniques described above in conjunction with step 150. In an exemplary embodiment, control module 40 discharges vehicle battery 26 by controlling the output of engine 16 so that it runs generator 22 in a manner where it produces less electrical power than is needed by motor 14 to satisfy the torque request. This causes the motor to draw the additional electrical power from vehicle battery 26, thereby discharging it in the process. This discharging process may continue until the battery SOC is less than or equal to the upper SOC threshold, for example. In relatively rare situations, step 160 may even discharge the battery by cutting off the fuel supply to the engine.

Step 170 fulfills or satisfies the torque request and charges the battery. This step may fulfill the requested torque and charge the battery in the same manner as described above. In an exemplary embodiment, after satisfying the torque request, control module 40 may increase the battery SOC by controlling the output of engine 16 so that it runs generator 22 in a manner where it produces more electrical power than is needed by motor 14 to satisfy the torque request. The excess electrical power is provided to vehicle battery 26, thereby charging it. This charging process may continue until the battery SOC is greater than or equal to the lower SOC threshold, for example.

Skilled artisans should appreciate that step 150-170 may vary from the exemplary embodiments described above. For instance, steps 150-170 may run for certain periods of time (e.g., few seconds, few minutes, etc.), they may run until certain limits have been reached (e.g., lower SOC threshold, upper SOC threshold, etc.), or they may run until an operator of the vehicle has provided a new request (e.g., higher torque request, lower torque request, brake request, acceleration request, etc.), to cite a few possibilities. Other techniques for charging, discharging and/or satisfying torque requests may also be used; this is particularly true considering that hybrid electric vehicles (HEVs), plug-in hybrid electric vehicles (PHEVs), extended-range electric vehicles (EREVs), battery electric vehicles (BEVs) and other vehicles may charge and discharge in different ways. This method could even be adapted for use with vehicles having fuel cells, as the fuel cells could operate similarly to the engine and charge and/or discharge the battery. Moreover, the method may be used with vehicles having a single electric motor or multiple electric motors. The present method is not limited to any particular technique.

Next, step 180 compares the current battery temperature to a battery threshold to determine if the vehicle battery has sufficiently heated up. The battery threshold used here may be the same threshold as used in step 120 or it may be a different threshold. In an exemplary embodiment, control module 40 compares the current battery temperature to a second temperature threshold (e.g., −15° C.) that is warmer than the temperature threshold used in step 120. If the battery temperature is below this threshold and therefore still extremely cold, the method may loop back to an earlier step in the method, such as step 110. If the battery temperature is now at or above this temperature threshold, then the method may end.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method of heating a vehicle battery used for vehicle propulsion, comprising the steps of:
   (a) sensing one or more battery conditions with battery sensors and one or more additional conditions with additional sensors, the battery conditions include a battery temperature and the additional conditions include a transmission state;
   (b) comparing the battery temperature to a temperature threshold; and
   (c) when the battery temperature is less than the temperature threshold and the transmission state is 'park', using both a charging operation and a discharging operation to rapidly cycle or oscillate a flow of electrical current into and out of the vehicle battery without regard to a torque request from a driver so as to quickly raise the battery temperature.

2. The method of claim 1, wherein step (b) further comprises comparing the battery temperature to a static temperature threshold that generally stays the same during the life of the vehicle battery.

3. The method of claim 1, wherein step (b) further comprises comparing the battery temperature to a dynamic temperature threshold that changes during the life of the vehicle battery in order to address changes in battery performance.

4. The method of claim 1, wherein step (a) further comprises sensing one or more battery conditions with battery sensors, the battery conditions include a battery temperature and a battery state-of-charge (SOC); and step (b) further comprises comparing the battery SOC to one or more SOC thresholds.

5. The method of claim 4, wherein if the battery state-of-charge (SOC) is greater than an upper SOC threshold and the transmission state is 'drive', then step (c) uses a discharging operation to both raise the battery temperature and to lower the battery SOC, and the discharging operation includes instructing a generator to provide less electrical power than is needed to fulfill a torque request for driving the vehicle.

6. The method of claim 4, wherein if the battery state-of-charge (SOC) is less than a lower SOC threshold and the transmission state is 'drive', then step (c) uses a charging operation to both raise the battery temperature and to raise the battery SOC, and the charging operation includes instructing a generator to provide more electrical power than is needed to fulfill a torque request for driving the vehicle.

7. The method of claim 4, wherein if the battery state-of-charge (SOC) is between a lower SOC threshold and an upper SOC threshold and the transmission state is 'drive', then step (c) uses both a charging operation and a discharging operation to raise the battery temperature, to maintain the battery SOC in a desired range, and to fulfill a torque request for driving the vehicle.

8. The method of claim 1, further comprising the step of:
sensing the battery temperature following the at least one charging or discharging operation of step (c), comparing the newly sensed battery temperature to a second temperature threshold that is greater than the temperature threshold of step (b), and if the newly sensed battery temperature is less than the second temperature threshold then repeating step (c).

9. The method of claim 1, further comprising the step of:
when the transmission state is 'drive', then determining a torque request that is representative of the torque or acceleration being requested of the vehicle, and fulfilling the torque request during the at least one of the charging operation or the discharging operation.

10. A method of heating a vehicle battery used for vehicle propulsion, comprising the steps of:
(a) sensing one or more battery conditions with battery sensors and one or more additional conditions with additional sensors, the battery conditions include a battery temperature and the additional conditions include a transmission state;
(b) comparing the battery temperature to a temperature threshold, the temperature threshold is a dynamic temperature threshold that changes during the life of the vehicle battery in order to address changes in battery performance; and
(c) when the battery temperature is less than the temperature threshold and the transmission state is 'park', using both a charging operation and a discharging operation to cycle electrical current into and out of the vehicle battery without regard to a torque request from a driver such that the internal resistance of the vehicle battery causes the electrical current to raise the battery temperature.

11. The method of claim 10, wherein step (a) further comprises sensing one or more battery conditions with battery sensors, the battery conditions include a battery temperature and a battery state-of-charge (SOC); and step (b) further comprises comparing the battery SOC to one or more SOC thresholds.

12. The method of claim 11, wherein if the battery state-of-charge (SOC) is between a lower SOC threshold and an upper SOC threshold, then step (c) uses both a charging operation and a discharging operation to both raise the battery temperature and to maintain the battery SOC in a desired range.

13. The method of claim 10, further comprising the step of:
sensing the battery temperature following the cycling of electrical current in step (c), comparing the newly sensed battery temperature to a second temperature threshold that is greater than the temperature threshold of step (b), and if the newly sensed battery temperature is less than the second temperature threshold then repeating step (c).

14. The method of claim 10, further comprising the step of:
when the transmission state is 'drive', then determining a torque request that is representative of the torque or acceleration being requested of the vehicle, and fulfilling the torque request during the cycling of electrical current into and out of the vehicle battery.

* * * * *